Figure 1:
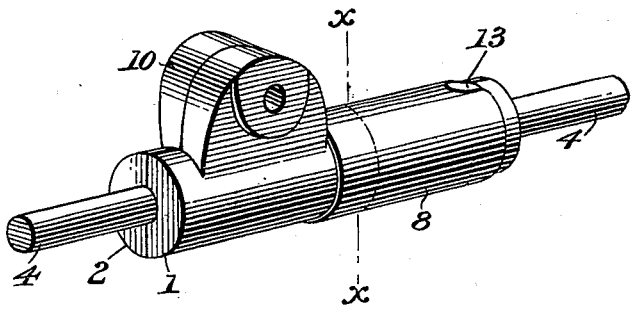

No. 642,477.　　　　　　　　　　　　　Patented Jan. 30, 1900.
H. McDOWELL.
ROD CLAMP.
(Application filed Oct. 28, 1899.)

(No Model.)

Harrison McDowell Inventor

Witnesses
Edwin H. McKee.
R. M. Smith.

By E. G. Siggers, Attorney

THE NORRIS PETERS CO., PHOTO-LITHO., WASHINGTON, D. C.

UNITED STATES PATENT OFFICE.

HARRISON McDOWELL, OF RENO, PENNSYLVANIA.

ROD-CLAMP.

SPECIFICATION forming part of Letters Patent No. 642,477, dated January 30, 1900.

Application filed October 28, 1899. Serial No. 735,111. (No model.)

*To all whom it may concern:*

Be it known that I, HARRISON McDOWELL, a citizen of the United States, residing at Reno, in the county of Venango and State of Pennsylvania, have invented a new and useful Rod-Clamp, of which the following is a specification.

This invention relates to rod-clamps such as are employed for connecting the sections of a rod used in driving wells.

The object of the invention is to provide a simple, cheap, and reliable clamp for coupling together the contiguous ends of the sections of a rod, whereby the employment of nuts or screw-threads is dispensed with and the rod-sections securely clamped together.

In the ordinary construction of rod clamps or couplings screw-threaded parts are employed and after the parts have been associated for a considerable length of time corrosion sets in and it is almost impossible to uncouple the sections without breaking them or impairing the efficiency of the clamp or coupling. It is the aim of the present invention to overcome this serious objection and at the same time to construct the coupling or clamp in such manner that the more strain that is put upon the rod-sections the more tightly will they be clamped together and prevented from becoming separated.

The detailed objects and advantages of the invention will be fully pointed out in the course of the ensuing description.

The invention consists in a rod clamp or coupling embodying certain novel features and details of construction and arrangement of parts, as hereinafter fully described, illustrated in the drawings, and incorporated in the claims.

Figure 2:
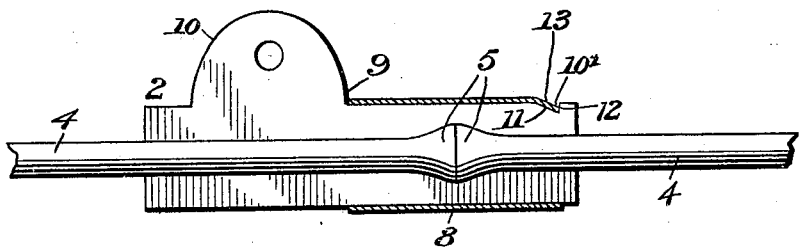
Figure 3:
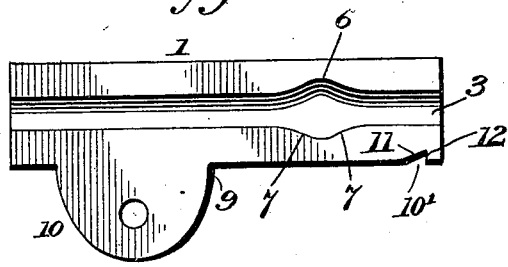
Figure 4:
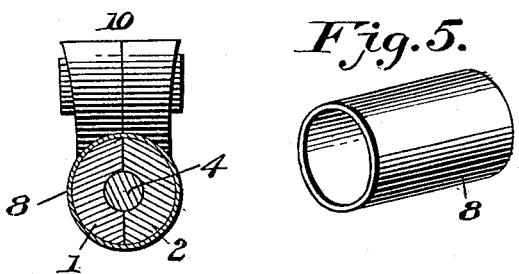
Figure 5:
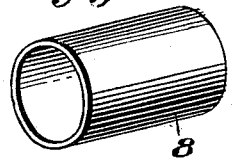

In the accompanying drawings, Figure 1 is a perspective view of a rod-clamp constructed in accordance with this invention, showing rod-sections engaged thereby. Fig. 2 is a longitudinal section through the same, taken in line with the meeting surfaces of the clamp-sections. Fig. 3 is a plan view of one of the clamp-sections detached. Fig. 4 is a cross-section taken on the line X X of Fig. 1. Fig. 5 is a detail view of the sleeve.

Similar numerals of reference designate corresponding parts in all the figures of the drawings.

The rod-clamp contemplated in this invention is of substantially cylindrical form and is divided centrally and longitudinally to comprise twin sections 1 and 2, which are in the form of a half-cylinder. The sections are provided in their flat meeting surfaces with longitudinal grooves 3 extending their entire length and opening out at their ends, so that when the sections are clamped together a longitudinal cylindrical bore is provided in which the rod-sections 4 are received.

In carrying out the present invention the rod-sections 4 are provided at their contiguous ends with heads 5, which are of conoidal shape, the heads being largest at their outer extremities and contracting in diameter therefrom inward until they merge into the rods proper. The grooves 3 are correspondingly enlarged intermediate their ends, as shown at 6, to provide reversely beveled or tapered engaging shoulders or surfaces 7, which coöperate with the conical heads or extremities 5 of the rod-sections. The two sections 1 and 2 of the clamp are brought together on opposite sides of the rod-sections, as shown in Fig. 1, and the sleeve or ferrule 8 is then slipped over one end of the sections until its inner end is brought to bear against a shoulder 9, formed by laterally-projecting perforated ears 10, which lie flatwise together and provide means for receiving a rope or other suspending device, by the aid of which the rod-clamps and rod-sections are suspended from an overhead support.

The clamp-sections are further provided near one end with registering notches 10, each having an inclined face 11 and an abrupt transverse face 12, forming a shoulder against which the outer edge of the sleeve or ferrule 8 bears. In order to accomplish this, a portion of the edge of the sleeve or ferrule is bent or mashed inward, as shown at 13 in Fig. 2, thereby preventing any possibility of the sleeve or ferrule slipping off the clamp-sections. The clamp-sections 1 and 2 are preferably cast, while the sleeve or ferrule 8 is of wrought or malleable iron; but it will of course be understood that any other suitable material may be employed in the construction of the parts of the rod-clamp.

In view of the above it will be seen that any strain on the rod-sections either in a pushing or pulling direction will cause the conical ends or heads 5 to coöperate with the reversely-inclined walls or surfaces 7, with the effect that the clamp-sections 1 and 2 will be forced slightly apart, and thereby caused to bind the sleeve or ferrule 8 firmly upon and around the sections, and the greater the strain put upon the rod-sections the greater will be the binding action of the sleeve thereon, so that it will be impossible for the rod-sections to become uncoupled. The bending in of the edge 13 of the sleeve forms an additional safeguard against the displacement of the sleeve or ferrule and may be resorted to when deemed expedient. The device is extremely simple and economical in construction and has been found perfectly reliable in practice. It does away with all threaded parts, and therefore obviates the liability of such threaded parts to corrode and become so firmly connected as to prevent their separation without destroying the coupling.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described the invention, what is claimed as new, and desired to be secured by Letters Patent, is—

1. The herein-described rod-clamp comprising a pair of semicylindrical sections provided in their meeting faces with opposing grooves forming a rod-receiving bore which is enlarged at an intermediate point to receive the terminal heads of the rod-sections, laterally-offset ears on the sections forming a stop-shoulder, a shoulder near one end of the clamp formed by notching the sections, and a sleeve surrounding the sections and abutting at one end against the laterally-offset ears, and having a portion of its opposite end pressed inward to engage the shoulder formed by notching the sections, substantially as and for the purpose specified.

2. The combination with rod-sections having enlarged conical ends, of a longitudinally-divided rod-clamp provided with a notch and having a rod-receiving bore enlarged at an intermediate point to form reversely-inclined surfaces coöperating with the enlarged ends of the rod-sections, and a sleeve adapted to be slid onto the clamp-sections, and adapted to be bent into interlocked engagement with the notch in the clamp, substantially as described.

In testimony that I claim the foregoing as my own I have hereto affixed my signature in the presence of two witnesses.

HARRISON McDOWELL.

Witnesses:
PETER BERRY,
L. D. GRANT.